March 8, 1932. J. A. PERRY 1,848,654
PRODUCTION OF HYDROGEN
Filed Aug. 30, 1930 4 Sheets-Sheet 2

INVENTOR
Joseph A. Perry

March 8, 1932.  J. A. PERRY  1,848,654
PRODUCTION OF HYDROGEN
Filed Aug. 30, 1930  4 Sheets-Sheet 4

Patented Mar. 8, 1932

1,848,654

UNITED STATES PATENT OFFICE

JOSEPH A. PERRY, OF SWARTHMORE, PENNSYLVANIA, ASSIGNOR TO THE UNITED GAS IMPROVEMENT COMPANY, OF PHILADELPHIA, PENNSYLVANIA, A CORPORATION OF PENNSYLVANIA

PRODUCTION OF HYDROGEN

Application filed August 30, 1930. Serial No. 478,933.

The present invention relates to the manufacture of hydrogen free of undesired admixtures from gas containing hydrogen and hydrocarbons.

The object of the invention is the provision of a method of obtaining large volumes of such hydrogen per volume of original gas.

In its broader aspect the invention comprises separating the free hydrogen in the gas from the hydrocarbons and from other undesired constituents which may be present, and recovering it, also effecting at least a partial separation of the hydrocarbons from the other constituents, subjecting the fraction of the gas containing the hydrocarbons to thermal decomposition, thereby decomposing the hydrocarbons to hydrogen, residual hydrocarbons and carbon, returning the resultant gas to the separation stage and separating the hydrogen from the hydrocarbons.

Preferably the thermal decomposition of the hydrocarbons is effected by passing the hydrocarbons through an ignited fuel bed maintained in ignited condition by periodic air blasting. The hydrocarbons are decomposed in passing through the fuel bed to hydrogen, residual hydrocarbons and carbon. The last is utilized in the fuel bed in the production of water gas by intermittently passing steam through the fuel bed. Steam may be passed through the fuel bed simultaneously with the hydrocarbon passage or alternately with the hydrocarbon passage. In either case water gas is produced from the liberated carbon, the bulk of which may be so utilized.

In the case of simultaneous steaming and hydrocarbon decomposition, water gas and cracked hydrocarbon gas comprised principally of hydrogen, carbon monoxide, residual hydrocarbons, and $CO_2$ is returned to the separation stage and the hydrogen separated from the hydrocarbons and from other constituents which may be undesired.

In the case in which all of the steaming or a portion thereof is separate from the hydrocarbon passage, water gas is produced which may be mixed with the cracked hydrocarbon gas and returned to the separation stage for the recovery of its hydrogen content, or may be otherwise utilized as for instance for fuel.

By the above method it will be understood that the free hydrogen in the original gas is recovered directly from the separation stage, combined hydrogen is recovered from the hydrocarbons by thermal decomposition followed by separation, and further hydrogen may be recovered from water gas produced in utilizing the carbon content of the hydrocarbons.

Still further hydrogen may be recovered by passing the water gas produced from the liberated carbon, together with carbon monoxide which may be separated in the separation stage over a suitably heated catalyst, with steam, producing hydrogen—according to the reaction—

$$CO + H_2O = CO_2 + H_2$$

The resultant gas containing $CO_2$ and residual $CO$ and hydrogen is returned to the separation stage for the separation and recovery of the hydrogen.

As an example of gas suitable for use in the proposed method mention may be made of coal gas from coke ovens or retorts, which contains hydrogen and hydrocarbons, and which may have the following composition—

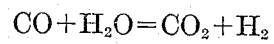

$H_2$—51.9%, $CH_4$—28.8%, $C_2H_6$—0.9%,
Illuminants—4.1%, $CO$—6.9%, $CO_2$—1.2%,
$O_2$—1%, $N_2$—5.2%.

Such a gas may be subjected to separation treatment by stages of scrubbing and refrigeration to separate the hydrogen from all the other constituents. If the hydrogen is desired for the manufacture of synthetic ammonia, it is unnecessary to remove the nitrogen. According to certain processes of synthetic ammonia production it is also unnecessary to remove all of the carbon monoxide which unites with some of the hydrogen to form methanol.

As an example of separation treatment, the gas may be compressed and the benzol content condensed out by cooling with ammonia, the cooled gas may be scrubbed with water and lye to remove the carbon dioxide, further compressed and cooled and individual fractions containing the bulk of the hydrocarbons and the carbon monoxide removed separately by liquefaction methods which are well-known, leaving the hydrogen and the nitrogen which are taken off together for utilization.

In other words, for the separation stage I may employ well-known methods such as those of Linde. For the thermal decomposition of the hydrocarbons I prefer to use a water gas set, in the fuel bed of which I decompose the hydrocarbons, and utilizing the fuel bed to retain the bulk of the liberated carbon, which I utilize in the production of hydrogen containing water gas.

The attached figures, which form a part of this specification, diagrammatically illustrate the method of this invention and in which—

Figure 1:
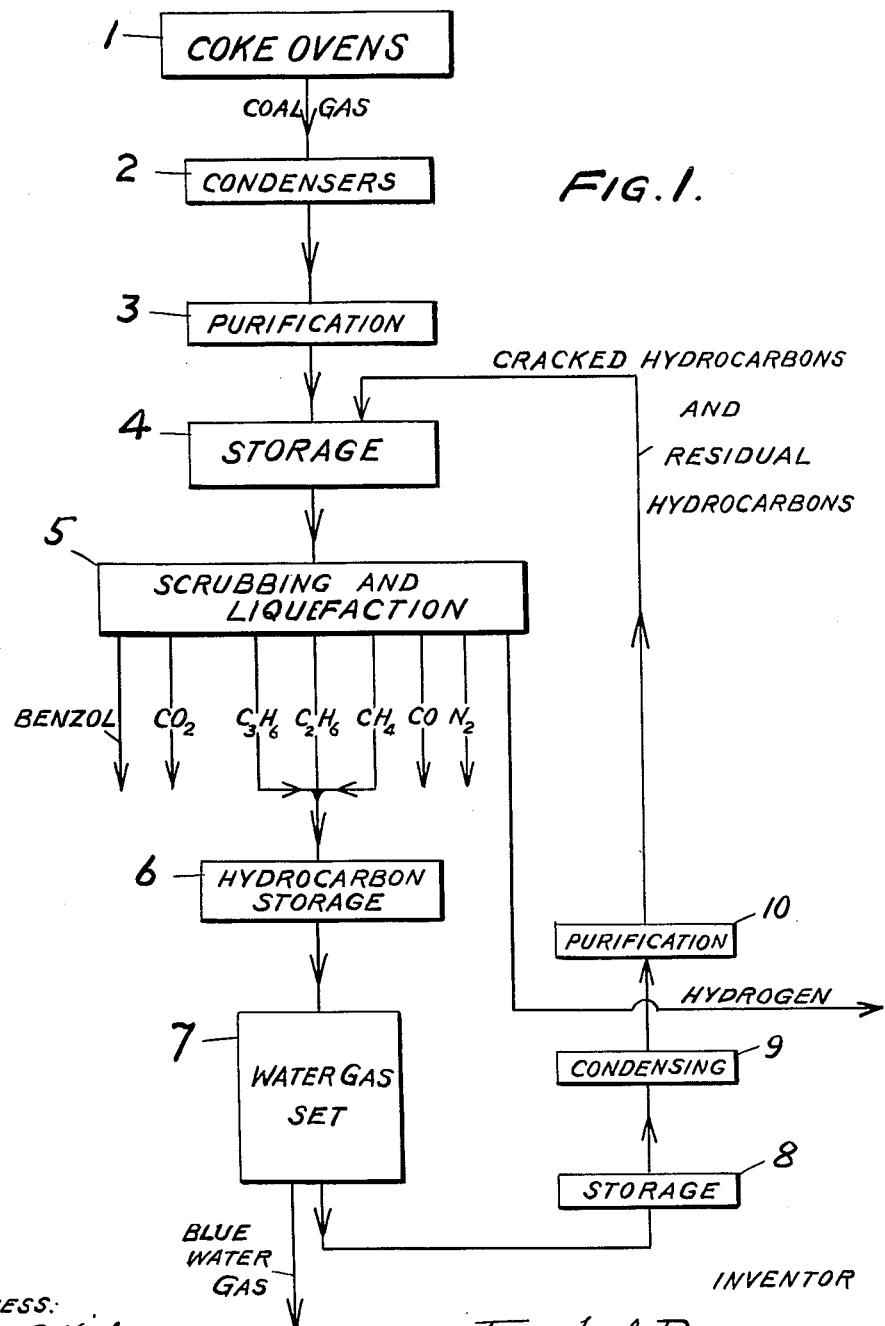
Figure 1 shows diagrammatically apparatus for carrying out the invention and indicates the flow of gas therethrough.

Referring to Figure 1, 1 diagrammatically indicates a battery of coke ovens, the coal gas from which is stripped of tar in condensers 2, and purified from sulphur in purifiers 3. It passes to the coal gas storage 4, and thence to the scrubbing and liquefaction apparatus 5. Here the other constituents are separated stage by stage from the hydrogen, which is led off as indicated. The other constituents are also at least partially separated from each other and drawn off. The hydrocarbon gases are united in the hydrocarbon storage 6 and are passed through the ignited fuel bed of the water gas set 7 between air blasting operations and there decomposed to hydrogen and residual hydrocarbons, the liberated carbon being deposited in the fuel bed and utilized by intermittently steaming the fuel bed to produce water gas which is led off for any desired utilization. The cracked gas passes through storage 8, condensers 9 to the coal gas storage 4, from whence it passes to the separation stage 5 with the coal gas, and its hydrogen is separated with that of the coal gas.

Figure 2:
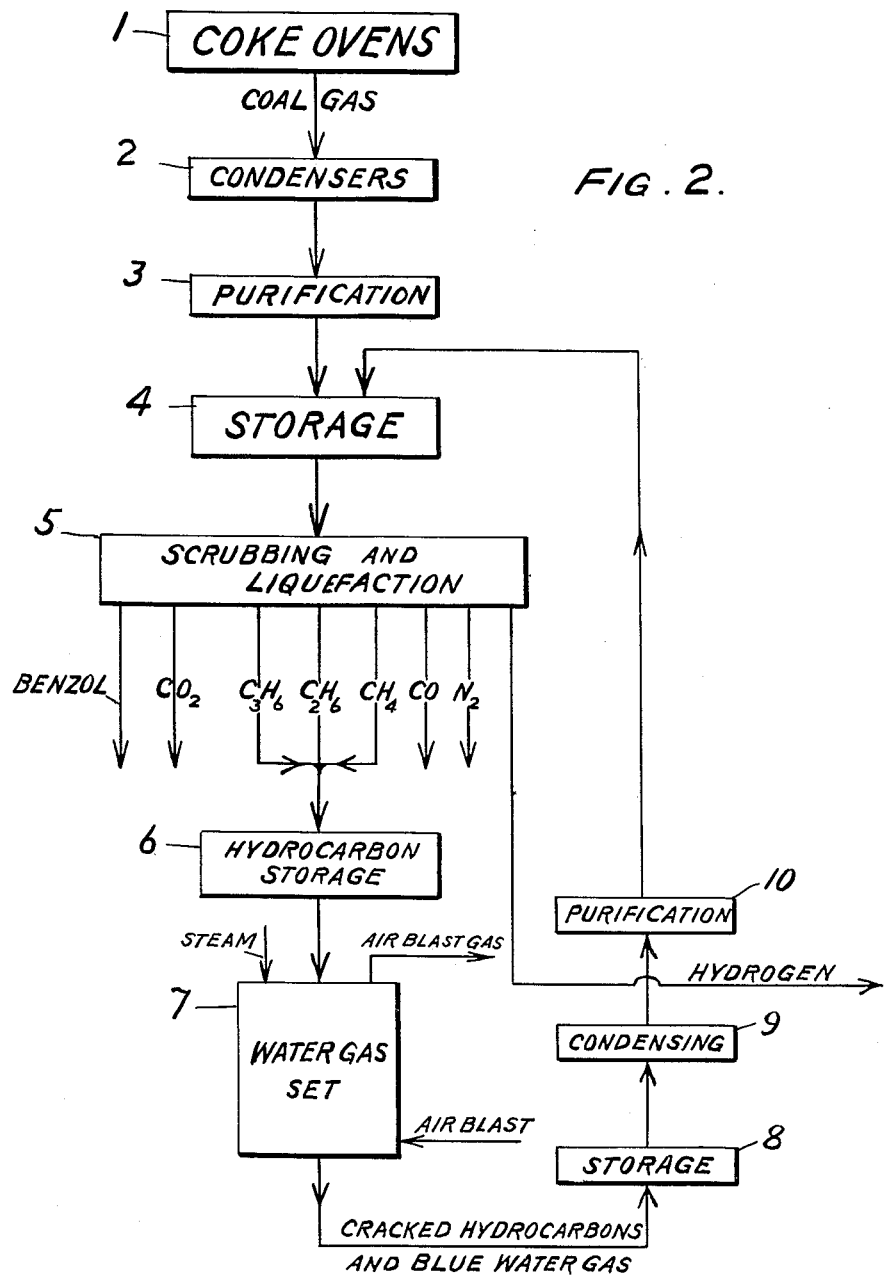
Figure 2 shows diagrammatically apparatus for carrying out a modification of the method indicated in Figure 1.

Referring to Figure 2,

This modification is similar to the method indicated in Figure 1, except that the water gas fuel bed is steamed simultaneously with the passage of hydrocarbon gas therethrough, and the resultant mixed water gas and cracked gas is returned to the coal gas storage 4 for passage through the separation stage 5. The purifier 10 is interposed to remove sulphur from the mixed water gas and cracked gas.

Figure 3:
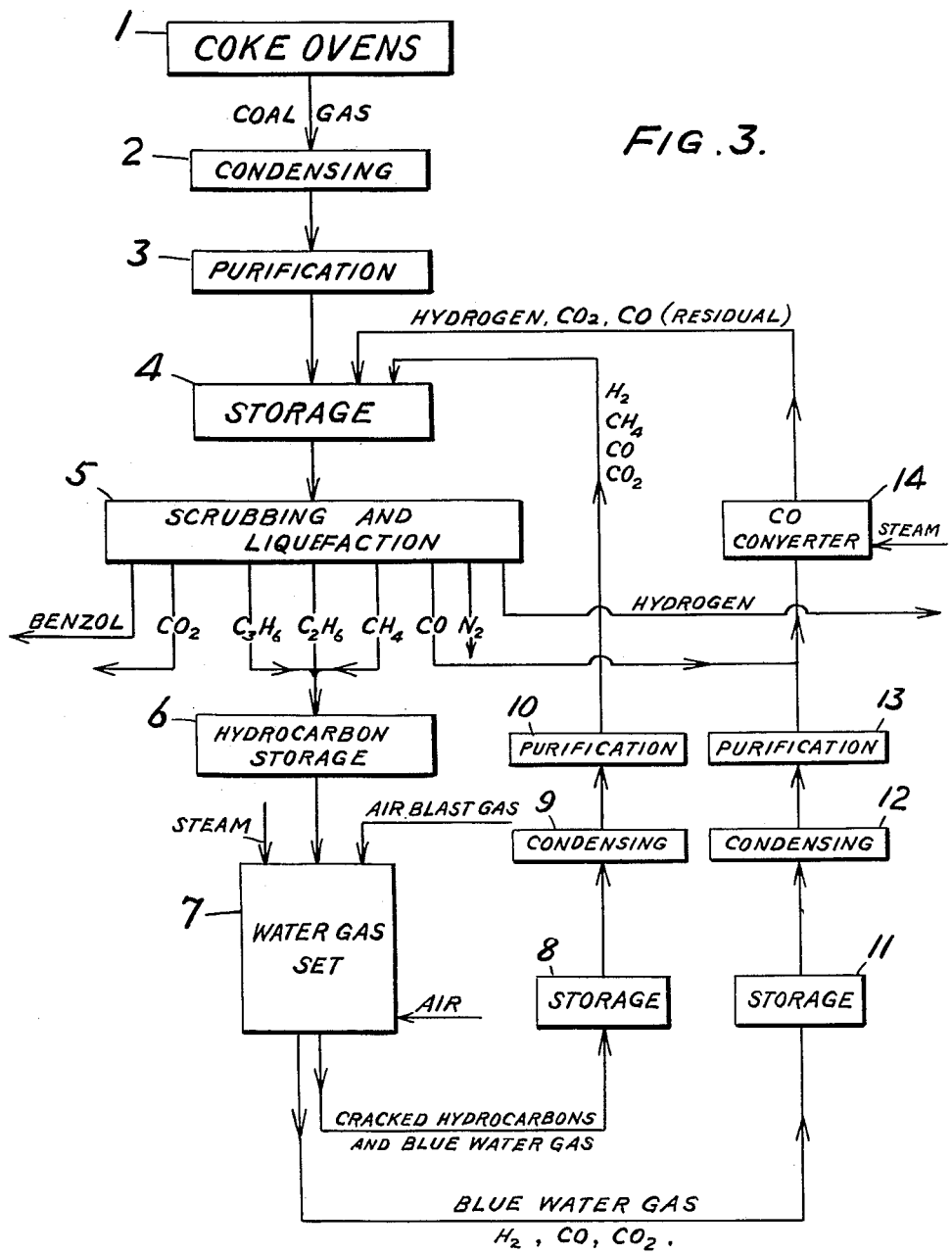
Figure 3 shows diagrammatically apparatus for carrying out a second modification of the method indicated in Figure 1.

Referring to Figure 3,

This figure shows a modification of the method of Figure 1 in which cracked gas and blue water gas produced by simultaneously passing the hydrocarbon gas and steam though the fuel bed of the water gas set, is returned as in Figure 2 to storage 4 for passage through the separation stage 5, and also blue water gas produced by a separate steaming step is passed through storage 11, condenser 12 and purifiers 13 to the CO converter 14, through which it is passed with steam over a hot catalyst such as iron oxide. CO from the separation stage 5 is also passed through the converter 14 with the blue water gas. The resultant hydrogen, carbon dioxide and residual CO is passed to the coal gas storage 4 for the separation of the hydrogen from the other constituents, in the separation stage 5.

The hydrogen from the separation stage 5 is thus comprised of the free hydrogen in the original coal gas, the hydrogen released by decomposition of the hydrocarbons of the coal gas, the hydrogen produced utilizing the carbon of the hydrocarbons for the decomposition of steam to form water gas, and the hydrogen from the conversion with steam of the carbon monoxide in the coal gas and that produced in the production of water gas from the carbon of the hydrocarbons.

Figure 4:
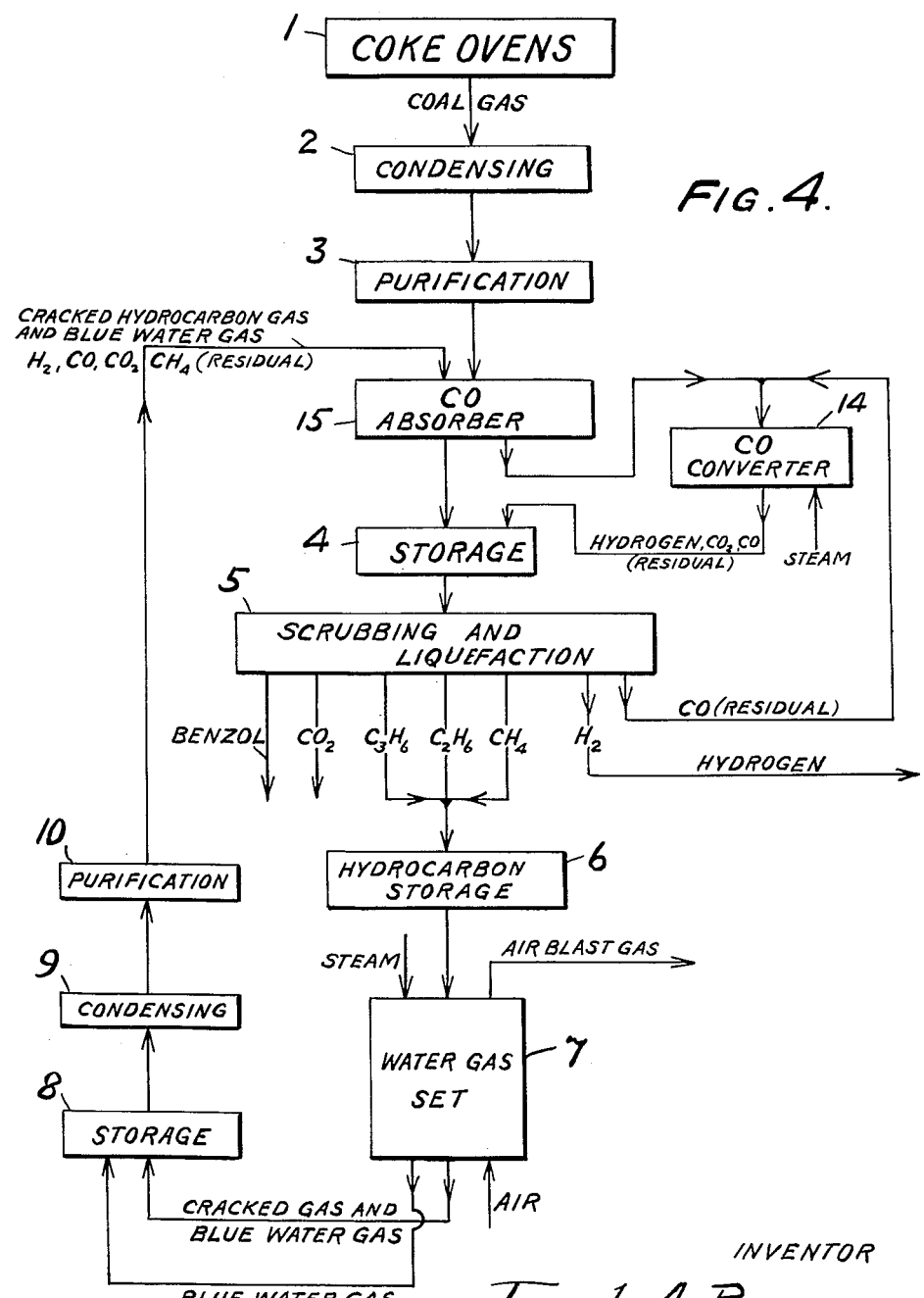
Figure 4 shows diagrammatically apparatus for carrying out a third modification of the method indicated in Figure 1.

Referring to Figure 4,

In this modification the coal gas after purification is stripped of carbon monoxide in the CO absorber 15 by scrubbing the gas with a carbon monoxide absorbing solution, for instance cuprous ammonium formate solution, from which the carbon monoxide is intermittently driven off by heating and recovered. The stripped gas passes to the storage 4 and thence through the separation stage 5 as before. The cracked hydrocarbon gas and the blue water gas, produced by steaming the water gas generator fuel bed both simultaneously and alternately with the hydrocarbon gas passage through the fuel bed, is passed through storage 8, condensers 9, purifiers 10 to the CO absorber 15. The carbon monoxide from the CO absorber, together with the residual carbon monoxide from the separation stage 5, is passed with steam through the CO converter 14 and the resultant hydrogen, carbon dioxide and residual carbon monoxide are pased through storage 4 to the separation stage 5.

As in Figure 3 the hydrogen from the separation stage 5 is comprised of the free hydrogen of the coal gas, the hydrogen of the coal gas hydrocarbons, hydrogen produced by utilizing the carbon of the hydrocarbons in the water gas reaction with steam, hydrogen produced by reaction with steam in the presence of a catalyst of the carbon monoxide of the coal gas and of the water gas produced in the above reaction of steam and the carbon of the hydrocarbons.

In connection with all of the above modifications, although the hydrogen led off from the separation stage is substantially free from undesired constituents, the other fractions need not be sharply separated. For instance the fraction labeled $CH_4$ may contain other hydrocarbons and some carbon monoxide. These fractions are indicated in the figures and referred to in the description by the name of their principal constituent.

I claim:

1. A process of making hydrogen which includes the steps of: subjecting a gas containing hydrogen and hydrocarbons to a separation stage wherein the hydrogen is separated from other undesired constituents and the hydrocarbon constituents of the gas are separated; leading off the hydrogen; passing the hydrocarbons through an ignited fuel bed thereby cracking them; and passing the gas issuing from the fuel bed through the separation stage thus removing the hydrogen therefrom.

2. A process of making hydrogen which includes the steps of: subjecting a gas containing hydrogen and hydrocarbons to a separation stage wherein the hydrogen is separated from other undesired constituents and the hydrocarbon constituents of the gas are separated; leading off the hydrogen; passing the hydrocarbons through an ignited fuel bed thereby cracking them; passing steam through the fuel bed; and passing the cracked hydrocarbons and the blue water gas produced in the fuel bed from the fuel bed through the separation stage thus removing the hydrogen therefrom.

3. A process of making hydrogen which includes the steps of: subjecting a gas containing hydrogen and hydrocarbons to a separation stage whereby the hydrogen is separated from undesired constituents, the hydrocarbon constituents of the gas are separated, and carbon monoxide is separated; leading off the hydrogen; passing the hydrocarbons through an ignited fuel bed thereby cracking them; leading the gas from the fuel bed through the separation stage thus separating the hydrogen therein; passing steam through the fuel bed; passing the blue water gas produced by the steam passage and the carbon monoxide produced in the separation stage through a converter whereby hydrogen is produced; and passing the gas from the converter through the separation stage thereby separating the hydrogen.

4. A process of making hydrogen which includes the steps of: subjecting a gas containing hydrogen and hydrocarbons to a separation stage whereby the hydrogen is separated from undesired constituents, the hydrocarbon constituents of the gas are separated, and carbon monoxide is separated; leading off the hydrogen; passing the hydrocarbons through an ignited fuel bed thereby cracking them and simultaneously passing steam through the fuel bed; leading the gas from the fuel bed through the separation stage thus separating the hydrogen therein; passing steam through the fuel bed; passing the blue water gas produced by the steam passage and the carbon monoxide produced in the separation stage through a converter whereby hydrogen is produced; and passing the gas from the converter through the separation stage thereby separating the hydrogen.

5. A process of making hydrogen which includes the steps of: passing a gas containing hydrogen, hydrocarbons and carbon monoxide through an absorption stake wherein the carbon monoxide is removed; passing the gas from which the carbon monoxide has been removed through a separation stage in which the hydrogen is separated from undesired constituents and in which the hydrocarbons are separated; leading off the hydrogen; passing the hydrocarbons from the separation stage through an ignited fuel bed thereby cracking them; passing the cracked hydrocarbon gas from the fuel bed through the absorption stage; passing the gas from which the carbon monoxide has been removed from the absorption stage through the separation stage; passing steam through the fuel bed; passing the blue water gas so produced through the absorption stage; passing the blue water gas from which the carbon monoxide has been removed from the absorption stage through the separation stage; passing the carbon monoxide from the absorption stage and from the separation stage through a conversion stage wherein hydrogen is produced; and passing the gas from the conversion stage through the separation stage.

6. A process of making hydrogen which includes the steps of: passing a gas containing hydrogen, hydrocarbons and carbon monoxide through an absorption stage wherein the carbon monoxide is removed; passing the gas from which the carbon monoxide has been removed through a separation stage in which the hydrogen is separated from undesired constituents and in which the hydrocarbons are separated; leading off the hydrogen; passing the hydrocarbons from the separation stage through an ignited fuel bed thereby cracking them and simultaneously steaming the fuel bed; passing the cracked hydrocarbon gas and the blue water gas from the fuel bed through the absorption stage; passing the gas from which the carbon monoxide has been removed from the absorption stage through the separation stage, passing steam through the fuel bed; passing the blue water gas so produced through the absorption stage; passing the blue water gas from which the carbon monoxide has been removed from the absorption stage through the separation stage; passing the carbon monoxide from the absorption stage and from the separation stage through a conversion stage wherein hydrogen is produced; and passing the gas from the conversion stage through the separation stage.

7. A process of making hydrogen which includes the following successive steps: subjecting a gas containing hydrogen and hydrocarbons to a separation stage wherein the hydrogen is separated from other undesired constituents and the hydrocarbon constituents of the gas are separated; leading off the hydrogen; cracking the hydrocarbons by exposing them to a suitable heat; and passing the gas resulting from the cracked hydrocarbons through the separation stage thus removing the hydrogen therefrom.

JOSEPH A. PERRY.